(12) United States Patent
Barker et al.

(10) Patent No.: US 8,012,396 B2
(45) Date of Patent: Sep. 6, 2011

(54) METHOD AND APPARATUS FOR STRETCHING AND CRYSTALLIZING THE NECK FINISH OF A MOLDED PLASTIC ARTICLE

(75) Inventors: Keith Barker, Bedford, NH (US); Brian Lynch, Merrimack, NH (US); Walter McDonald, Newton, NJ (US); Norbert Seitel, Gillette, NJ (US)

(73) Assignee: Graham Packaging Company, L P, York, PA (US)

( * ) Notice: Subject to any disclaimer, the term of this patent is extended or adjusted under 35 U.S.C. 154(b) by 206 days.

(21) Appl. No.: 12/538,356

(22) Filed: Aug. 10, 2009

(65) Prior Publication Data

US 2009/0295030 A1     Dec. 3, 2009

Related U.S. Application Data

(63) Continuation of application No. 11/516,384, filed on Sep. 6, 2006, now Pat. No. 7,572,123.

(51) Int. Cl.
    *B28B 5/00*    (2006.01)
(52) U.S. Cl. ............... 264/297.6; 264/297.8; 425/324.1
(58) Field of Classification Search ............... 264/297.6, 264/297.8; 425/324.1
    See application file for complete search history.

(56) References Cited

U.S. PATENT DOCUMENTS

| | | |
|---|---|---|
| 1,934,250 A | 11/1933 | Wynne et al. |
| 3,496,610 A | 2/1970 | Aykanian et al. |
| 3,562,372 A | 2/1971 | Schjeldahl et al. |
| 3,612,254 A | 10/1971 | Wideman |
| 3,655,064 A | 4/1972 | Mayer |
| 4,386,046 A | 5/1983 | Yoshino et al. |
| 4,397,629 A | 8/1983 | Akutsu et al. |

(Continued)

FOREIGN PATENT DOCUMENTS

WO    WO 2004/067263 A    8/2004

(Continued)

OTHER PUBLICATIONS

International Search Report and Written Opinion in corresponding PCT/US2007/077600 dated Jul. 3, 2008.

(Continued)

*Primary Examiner* — Yogendra N Gupta
*Assistant Examiner* — Alison Hindenlang
(74) *Attorney, Agent, or Firm* — Rissman Hendricks & Oliverio LLP

(57) ABSTRACT

Apparatus and method for making a molded plastic article having a stretched and crystallized neck finish. In one embodiment, a series of platforms are carried by a conveying apparatus for transporting a series of molded plastic articles along a predetermined path of travel through one or more treatment stations. At a finish widening station, the molded article, having a relatively wide and thin-walled blow-molded body portion, and a relatively narrow and thick-walled unexpanded neck finish portion, is positioned to enable insertion of a mandrel into an open top aperture of the finish portion to widen the finish. The mandrel may include a lower heated tapered portion for expanding the finish, and an upper cooled body portion on which the expanded finish may be cooled. The article may then be sent to a finish crystallizing station having a heating device that heats the widened finish portion for a time and temperature selected to crystallize at least a portion of the widened finish. A sizing mechanism positionable in the widened finish supports the finish during crystallization.

17 Claims, 9 Drawing Sheets

U.S. PATENT DOCUMENTS

| | | | |
|---|---|---|---|
| 4,412,966 A | | 11/1983 | Yoshino et al. |
| 4,725,219 A | | 2/1988 | Jakobsen et al. |
| 4,781,954 A | | 11/1988 | Krishnakumar et al. |
| 4,894,198 A | | 1/1990 | Albrecht et al. |
| 5,224,586 A | | 7/1993 | Naka et al. |
| 6,042,360 A | * | 3/2000 | Padovani .................... 425/403.1 |
| 6,099,766 A | * | 8/2000 | Aoki et al. ...................... 264/39 |
| 6,572,812 B2 | | 6/2003 | Collette et al. |
| 6,802,705 B2 | | 10/2004 | Brand et al. |
| 6,884,382 B2 | | 4/2005 | Lynch et al. |
| 2004/0146672 A1 | | 7/2004 | Lynch et al. |
| 2005/0003123 A1 | | 1/2005 | Nahill et al. |
| 2005/0153089 A1 | | 7/2005 | Lynch et al. |
| 2005/0236356 A1 | | 10/2005 | Lonsway |
| 2005/0269744 A1 | | 12/2005 | Lonsway |

FOREIGN PATENT DOCUMENTS

WO    WO 2005/110716 A    11/2005

OTHER PUBLICATIONS

Partial International Search Report mailed Feb. 8, 2008 in corresponding application PCT/US2007/077600.

* cited by examiner

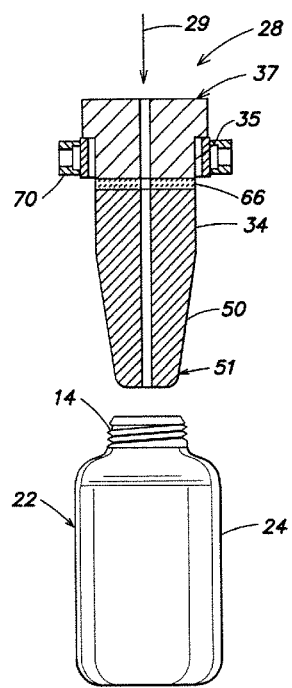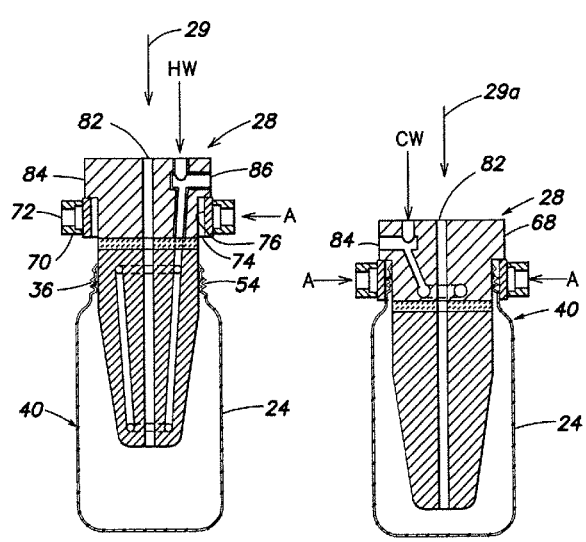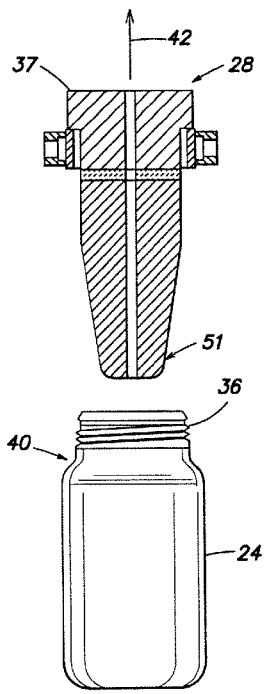
FIG. 11A          FIG. 11B          FIG. 11C          FIG. 11D

METHOD AND APPARATUS FOR STRETCHING AND CRYSTALLIZING THE NECK FINISH OF A MOLDED PLASTIC ARTICLE This application is a continuation of U.S. application Ser. No. 11/516,384, filed 6 Sep. 2006, now U.S. Pat. No. 7,572,123.

FIELD OF THE INVENTION

The present invention relates to molded plastic articles, such as food and beverage containers, and to a method and apparatus for manufacturing such articles. In various embodiments, a method and apparatus are disclosed for making a plastic container having a stretched and crystallized neck finish.

BACKGROUND OF THE INVENTION

Molding processes (e.g., injection, compression, extrusion) are known for making preforms which are then expanded (e.g., blow molded) to form containers and other packaging articles. Typically such preforms/containers have a relatively narrow-neck finish, to which a closure such as a screw-on cap can be attached. However, in many applications it would be desirable to provide a wide-neck container for ease of access or pouring. It may also be desirable to heat-treat or otherwise process such a wide-neck finish of the container for various applications (e.g., high temperature filling or pasteurization) while still maintaining accurate dimensions of the neck finish, and in particular any threads on the finish.

Molding processes and equipment for making bottles having various neck (a/k/a finish) sizes are disclosed in U.S. Pat. No. 6,884,382, U.S. Pat. No. 6,572,812, U.S. Patent Publication No. 2005/0003123 and U.S. Patent Publication No. 2005/0236356, the disclosures of all of the foregoing of which are incorporated herein by reference in their entirety as if fully set forth.

SUMMARY OF THE INVENTION

The present invention relates to the treatment of molded plastic articles, such as preforms and containers.

In one embodiment of the invention, an apparatus and method are provided for treating a series of molded plastic articles, each article having a relatively wide and thin-walled blow-molded body portion and a relatively narrow and thick-walled unexpanded neck finish portion. A series of platforms are carried by a conveying apparatus that transports the platforms along a predetermined path of travel through a finish widening station. Each platform has a top surface for engaging a bottom surface of the body portion of one article, and a mating mechanism for engaging a sidewall surface of the body portion of the one article. The finish widening station includes a mandrel insertable within and removable from an open top aperture of the finish portion, to widen the finish portion. The mating mechanism adjustably receives and engages against the sidewall portion to hold the article in a steady position relative to the platform during insertion and removal of the mandrel from the aperture. One or both of the mandrel and article may be rotated during insertion and/or removal of the mandrel from the finish.

In another embodiment, the predetermined path of travel further includes a finish crystallizing station having a heating device that heats the widened finish portion for a time and temperature selected to crystallize at least a portion of the widened finish. A sizing device, insertable within and removable from the widened finish portion, supports the finish during the crystallizing step. The article is still supported on the platform so that the mating mechanism engages the sidewall portion in a steady position relative to the platform during insertion and removal of the sizing device from the widened finish. One or both of the sizing device and article may be rotated during insertion and/or removal of the sizing device from the finish.

In another embodiment, an apparatus is provided for treating a series of molded plastic articles. The apparatus includes a series of platforms carried by a conveying apparatus that transports the platforms along a predetermined path of travel through one or more treatment stations. Each platform, as previously described, has a top surface and a mating mechanism for engaging the body portion of one article. A deposit mechanism deposits one article on each platform in an orientation that directs the bottom surface of the body portion into engagement with the top surface of the platform and arranges the finish portion in an orientation that enables an operational mechanism of the treatment station to engage the finish portion. As previously described, the mating mechanism adjustably receives and engages against the sidewall portion to hold the one article in a steady position on the platform during transport of the article through the one or more treatment stations.

One such treatment station may provide a mandrel that is forcibly insertable within and removable from an open top aperture of the finish portion, to widen the finish portion. The one or another station may include a heating device that heats the finish portion prior to the insertion of the mandrel. The one or another treatment station may include a cooling device that cools the widened finish portion. The one or another treatment station may provide a heating device that heats the finish portion for a time and to a temperature selected to crystallize at least a portion of the widened finish portion. At the crystallizing station a sizing cup may be positioned within the widened finish portion for maintaining the finish size during the crystallizing treatment.

In another embodiment, a method is provided for treating a series of molded plastic articles through one or more treatment stations having an operational mechanism. The method includes steps of providing a series of platforms that are transported by a conveying apparatus through the one or more treatment stations. Each platform has a mating mechanism having a recess that adjustably receives and engages a relatively wide and thin-walled blow-molded body portion of the article. Each article is deposited on a platform and within the recess of the mating mechanism in an orientation that aligns a finish portion of the article in a position that enables operational engagement with an operational mechanism at the treatment station. The articles are conveyed on the platforms through the one or more treatment stations, while treating the articles with the respective operational mechanism. The step of treating may comprise widening the finish portion, for example by inserting an expansion mandrel within an open top aperture of the finish portion to widen the finish portion. The step of treating may include heating the finish portion to enable insertion of the mandrel. The treating may further include cooling the widened finish portion. The cooling may be both interior conductive cooling and exterior convective cooling of the widened finish portion. The step of treating may further comprise heating of the widened finish portion to crystallize at least a portion of the widened finish portion. Preferably, a sizing device is provided in the expanded finish portion as it is being heated and crystallized.

In one preferred embodiment, the step of treating includes heating and widening the finish portion by inserting an expansion mandrel within an open top aperture of the finish portion, cooling the widened finish portion by interior conductive cooling and exterior convective cooling, and heating and crystallizing at least a portion of the widened finish portion while a sizing device is positioned in the widened finish portion.

In one embodiment, the mandrel has a lower tapered body portion insertable into the open top aperture of the finish portion for widening the neck finish portion from a first neck size to an expanded second neck size. The lower body portion is heated. The mandrel further includes an upper body portion of the second expanded neck size. At least a portion of upper body portion is cooled for cooling the expanded neck finish portion. The outer surface of the mandrel preferably comprises a low friction material, which may be provided as an outer layer. Preferably, the mandrel further includes an exterior cooling mechanism for directing a stream of cooling fluid (e.g., air) into contact with an exterior surface of the expanded neck finish portion, the exterior cooling fluid being provided in the form of a halo or ring, around the expanded finish. The exterior cooling mechanism may include a collar mounted on the upper mandrel body.

In accordance with one method of expanding a neck finish portion of a molded article, the method includes the steps of providing a mandrel for widening the neck finish from a first size to a second size, the mandrel having a heated lower tapered body portion which increases in cross sectional size along its length from a distal end to a proximal end, and having a cooled upper body portion positionable within the expanded neck finish, forcibly inserting the lower mandrel portion into an open top aperture of the neck finish to widen the neck finish portion from the first neck size to the expanded second neck size, and cooling the expanded neck finish while positioned on the upper body portion. The step of cooling may include convective cooling of the exterior of the widened finish portion.

In accordance with another embodiment, a method is provided for forming a wide mouth container including the steps of molding a container having an unexpanded neck finish portion of a first neck size, widening the neck finish to a second neck size, inserting a sizing device into the widened finish for supporting the widened finish, heating the widened finish while positioned on the sizing device to a temperature and for a time selected to crystallize at least a portion of the widened finish, cooling the crystallized finish, and removing the sizing device from the finish. One or both of the finish and sizing device may be rotated around an axis of insertion during insertion and/or removal of the sizing device from the finish. The step of cooling the crystallized finish prior to removal of the sizing device may be accomplished by directing cooling air into the sizing device to draw heat from the finish (the sizing device serving as a heat sink). The finish may include threads on an outside surface of the finish, and the step of heating the widened finish may comprise heating the outside surface of the finish at a time and temperature selected to crystallize the finish including the threads along a selected depth of the finish from the outside surface toward the inside surface.

In another embodiment, an apparatus is provided for crystallizing a neck finish of a molded container, the apparatus including a sizing device for supporting an inside surface of the neck finish of the container, a mechanism for inserting the sizing device into an open top aperture of the finish, a heating mechanism that directs heat onto the outside surface of the finish while the sizing device is inserted within the finish, and the heating mechanism being controlled to heat the finish to a temperature and for a time sufficient to crystallize the finish along a selected portion of the depth of the finish from an outside surface toward the inside surface of the finish. The sizing device may comprise a hollow cup shaped metal body having an outer layer of a low friction polymer material. A rotation device may allow rotation of one or both of the sizing device and the finish upon insertion and/or removal of the sizing device from the finish.

The terms "narrow-neck" finish and "wide-mouth" finish are employed in a relative sense in the present application. For example, in the plastic beverage/food container industry a "wide neck" or "wide-mouth" finish generally has an outside diameter (E diameter) greater than 2.0 inches or 50 mm, while a narrow-neck finish has an outside diameter equal to or less than 2.0 inches or 50 mm. As further examples, 28 mm and 43 mm finishes are typical narrow-neck finishes in the plastic container industry, although the present invention is by no means limited to these particular finish diameters. A 63 mm finish is a typical wide-neck finish in the plastic container industry, although the present invention again is not limited to wide-neck finishes of this particular size. An 83 mm finish is another conventional wide-neck finish size.

These and other features and/or advantages of various embodiments of the invention may be understood by referring to the following detailed description and drawings.

BRIEF DESCRIPTION OF THE DRAWINGS

FIG. 11 is a series of detailed cross-sectional views of the mandrel of FIG. 10 being used to expand a neck finish.

DETAILED DESCRIPTION

Figure 1:
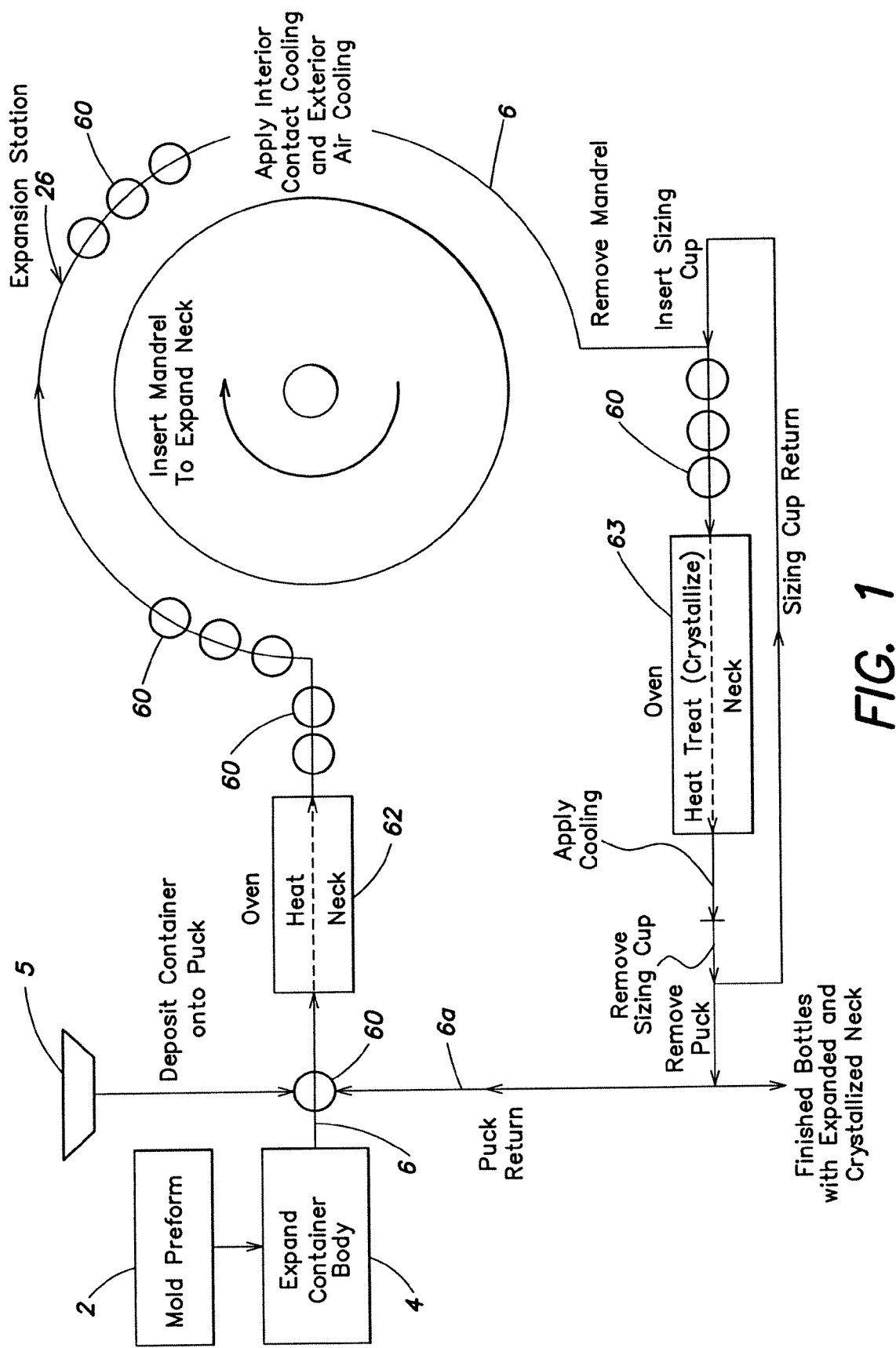
FIG. 1 is a schematic diagram of one embodiment of a method and apparatus for finish expansion and crystallization according to the invention.

The figures show one embodiment of a process and apparatus for widening the neck of a molded article according to the invention. FIG. 1 is an overview of the process and apparatus, while the later figures provide more detail of the individual steps/components.

In the embodiment shown, a narrow-neck preform 10 (see FIG. 2) is first injection molded (step 2 of FIG. 1) and then blow molded (step 4 of FIG. 1) to form an intermediate container product 22 (see FIG. 3) having a relatively wide and thin-walled expanded body portion 24 with the same relatively narrow and thick-walled unexpanded neck finish 14. A series of such intermediate container products 22 are formed as a result of blow mold step 4 and deposited (one each) onto a series of supporting structures (platforms or pucks), shown generally in FIGS. 1 and 5 as disc-like elements 60, for supporting and conveying the individual intermediate container products 22 upright and in a defined spaced apart relation while carried by a conveyor 67 driven along a path 6. The molded articles 22 are heated during the blow molding process and, before being deposited onto the platforms, are cooled to a temperature at which they will not be deformed by the conveying apparatus.

In the embodiment of FIG. 1, the blow molded narrow-neck intermediate container products 22 are routed through a first oven treatment station 62 that heats at least the neck finish portion 14 (FIG. 3) of each article 22 to a temperature sufficient to enable the finish 14 to be mechanically widened/expanded (at expansion station 26) by forcible downward insertion of a mandrel 28, as described in detail below. As shown in FIGS. 5 and 11A-D, an outer surface of the rotating tapered mandrel 28 engages an interior surface 52 of the finish and radially enlarges the narrow finish 14 to form a widened finish 36 (see FIG. 4). A lower tapered portion 50 of the mandrel 28 is heated by a flow of hot water (HW) through fluid channels in the portion 50, to maintain the finish at a desired expansion temperature (see FIG. 11B). After the finish is fully expanded by the lower tapered portion 50, the widened finish 36 is positioned over an expanded upper cylindrical portion 35 of the mandrel. The upper mandrel includes a body portion 37 which is cooled by a flow of cold water (CW) through fluid channels in the body 37 (see FIG. 11C). The interior surface 52 of the expanded neck 36 is cooled by conduction contact with the body 37. Also, while the mandrel 28 is still inserted within the expanded neck 36, a jet of cold air (A) in the form of a ring or halo is applied via a mandrel collar mechanism 70 to and around the outside surface 54 of the widened finish 36 to effect convective cooling.

Upon removal of the neck-expanding mandrel 28 from the cooled widened neck 36, a sizing device 100 (see FIG. 8) is preferably inserted within the widened neck 36. A series of expanded finish articles 40, each still mounted on an individual platform 60 and with a sizing device 100 inserted in the expanded finish 36, are routed by the conveyor 67 through a second oven treatment station 63 such that at least some portion of the widened neck finish portion 36 of each article 40 is heated for a time and to a temperature sufficient to effect at least partial crystallization of the polymer material of the finish 36. As shown in FIG. 1, after emerging from the second oven treatment 63, the enlarged crystallized finish is cooled. The sizing device is cooled and serves as a heat sink to draw heat out of the finish. The sizing device 100 is then removed from the finish 36, and the finished bottles 40 with expanded and crystallized finishes are then removed from the platforms. The conveyor 67 with empty platforms (pucks) is routed back along path 6a to the entry of the first oven treatment station 62 for receipt of new intermediate container products 22 on the platforms 60.

Figure 2:
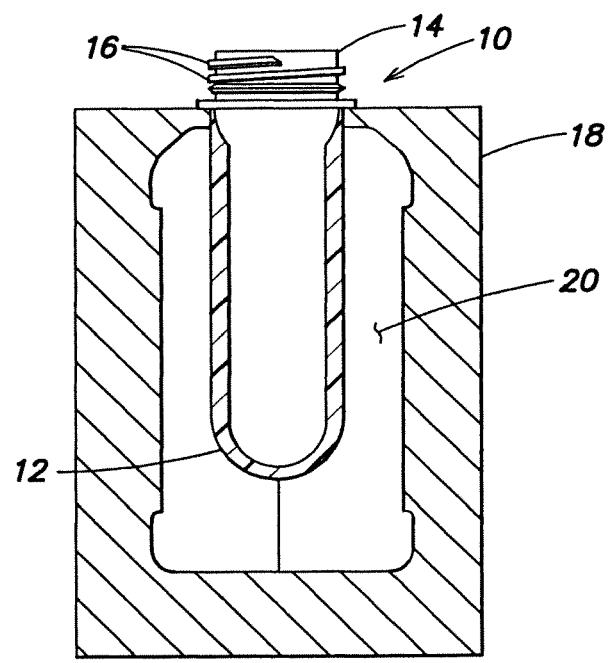
FIG. 2 is a cross-sectional view of a preform positioned in a blow mold for expanding the preform body to form an intermediate container product.

As shown in FIG. 2, a typical preform 10 has a tubular body 12 closed at the lower end and an integrally molded finish 14.

Figure 3:
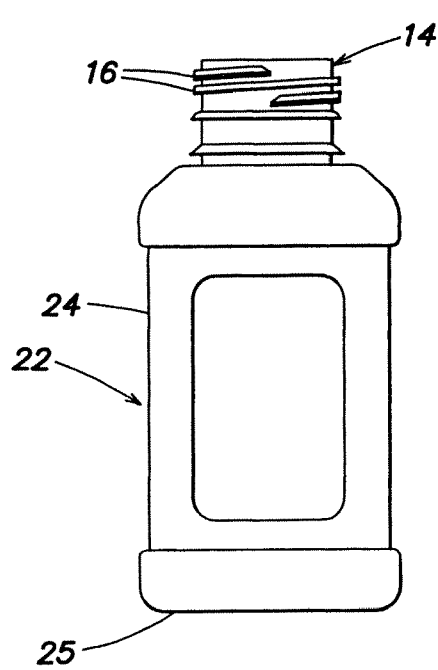
FIG. 3 is a schematic elevational view of an intermediate container product formed in the blow mold of FIG. 2.

The finish 14 has one or more external threads 16. The threads can be external male threads or internal female threads (not shown) that are configured to be matable with the threads of a complementary closure or cap (not shown). The preform 10 is typically fabricated in an injection, extrusion or compression molding operation, and can be of monolayer or multilayer construction. Examples of molding processes are disclosed in, for example, U.S. Pat. No. 4,781,954, the disclosure of which is incorporated by reference herein as if set forth in its entirety. The molded preform 10 is then positioned in a blow mold 18 (FIG. 2) for expansion of the preform body 12 within mold cavity 20. Application of a stretch rod and air under pressure to the interior of preform 10 expands preform body 12 to the confines of mold cavity 20. The resulting intermediate container article 22, as illustrated in FIG. 3, has a relatively wide and thin-walled blow-molded body portion 24 (formed by expansion of preform body 12), and a relatively narrow and thick-walled neck finish portion 14 with external threads 16 (same as preform neck 14).

Figure 5:
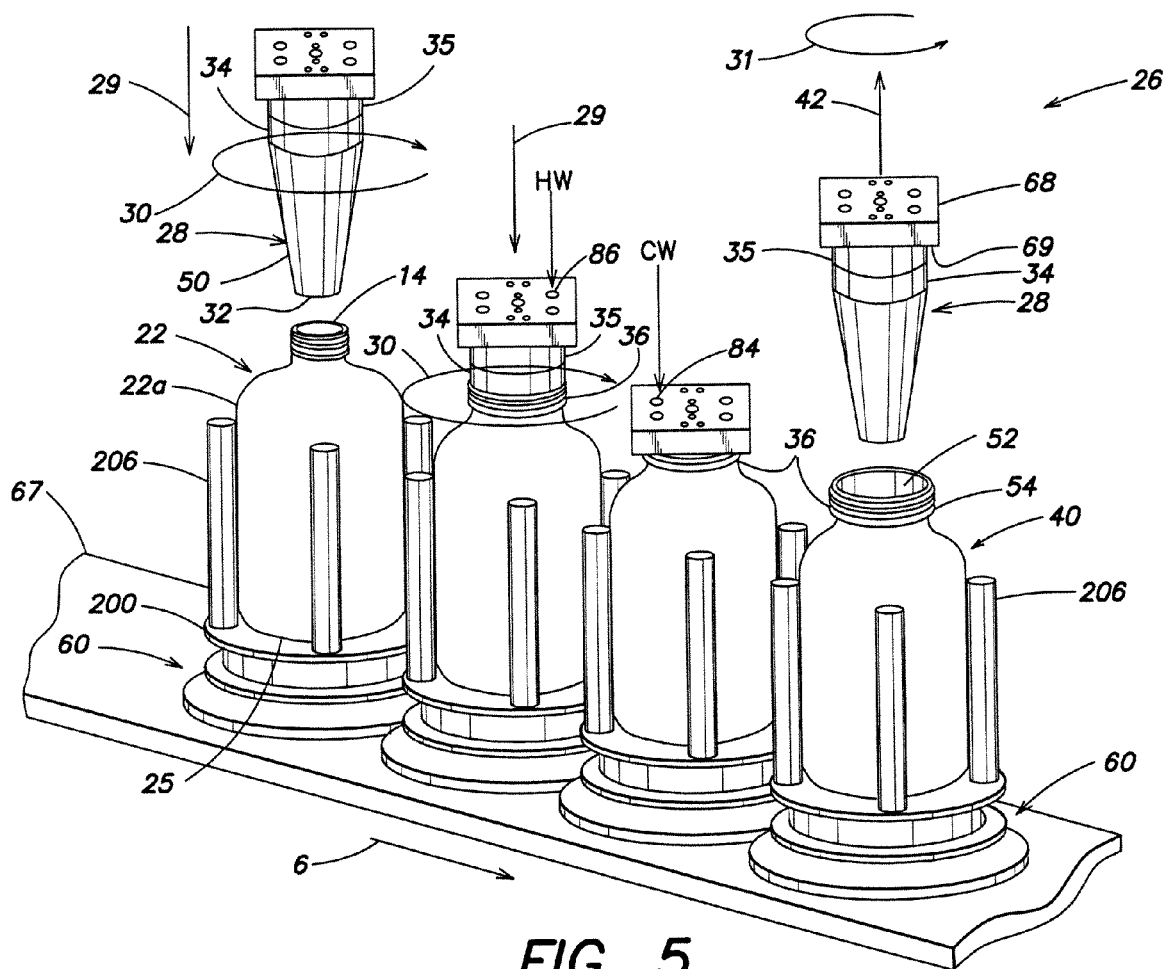
FIG. 5 is a schematic diagram of one embodiment of a method and apparatus for sequential positioning of a neck expansion mandrel in the finish of each of a series of intermediate container articles to produce a wide mouth finish in each article.
Figure 10:
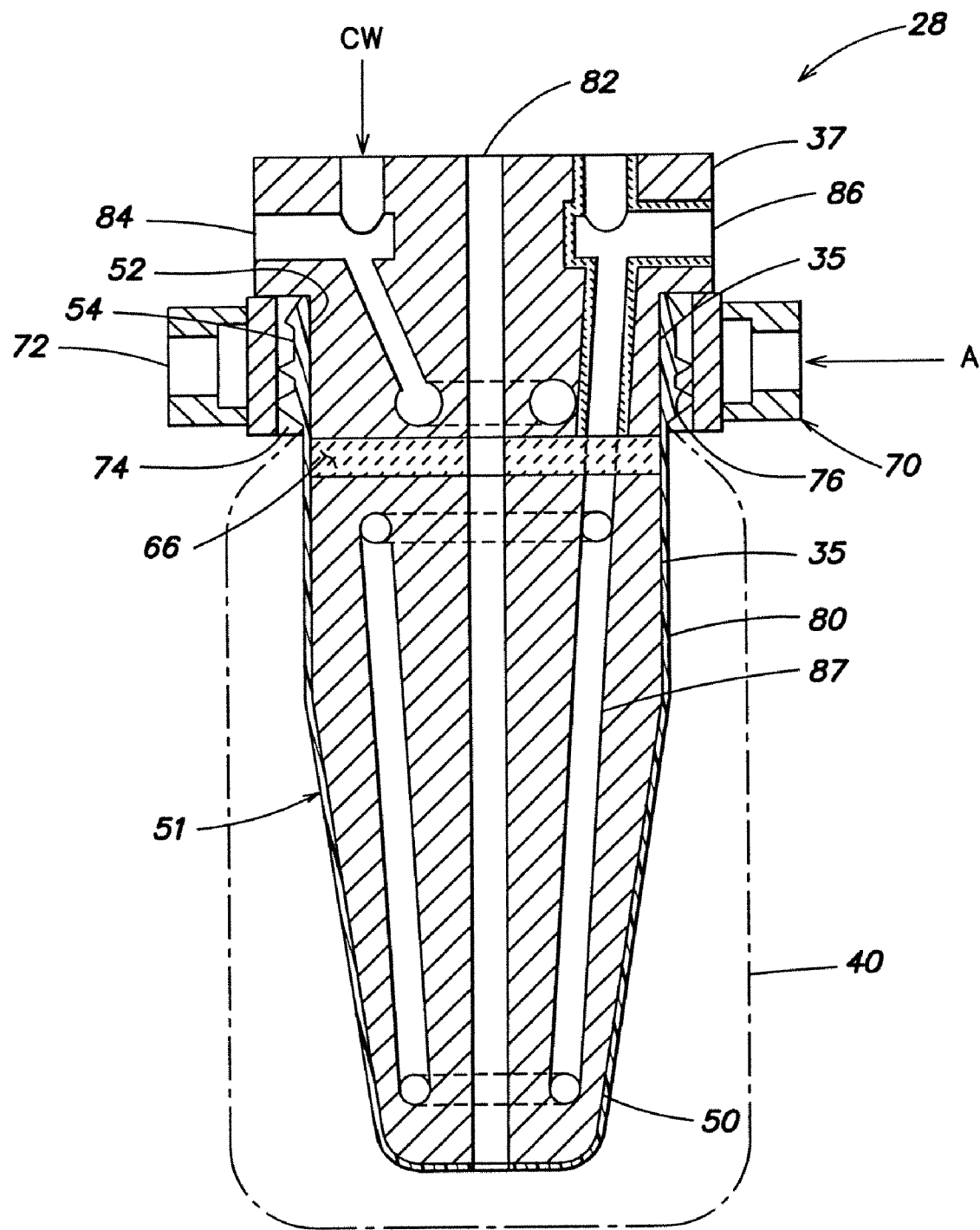
FIG. 10 is a detailed cross-sectional view of a neck expansion mandrel for use in one embodiment of the invention.

As noted with reference to FIGS. 1 and 5, a series of intermediate container articles 22 are deposited (one each) on a series of platforms (or pucks) 60 for routing initially to the first oven treatment station 62, followed by the neck finish expansion station 26 (62 and 26 may also be collectively referred to as one heat treatment and neck expansion treatment station). Typically when the mandrel or plug 28 is being inserted into narrow-neck finish 14 of the intermediate article 22, the mandrel 28 is being rotated (see arrow 30 in FIG. 5) about its insertion axis. Alternatively, mandrel 28 can be held stationary, and the article 22 rotated during insertion of mandrel 28 (see arrow 33 in FIG. 6), or both the mandrel and article can be rotated. As shown in FIGS. 5 and 10-11, mandrel 28 has a tapered or conically shaped lower portion 50, with a preselected minimum lower end diameter 32 that is less than the inside diameter of the narrow neck preform finish 14 (as initially molded), and mandrel 28 has an upper intermediate portion 34 having a diameter equal to or slightly greater than (to allow for relaxation) the desired inside diameter of the final widened finish 36 of the bottle 40. Mandrel 28 also has a cylindrical upper portion 35 (having the same diameter as portion 34) to fit into the expanded container finish 36. The lower body 51 (including portions 50 and 34) of plug/mandrel 28 is preferably heated, e.g., by injection of a flow of hot water (HW) through channels 86 provided within the lower body of the mandrel 28, so as to maintain the previously heated finish at a temperature which facilitates expansion. The expanded finish 36 is then subsequently cooled via input of cold water (CW) flow via flow channels 84 provided within an upper body 37 (including portion 35) of the mandrel 28, by conduction contact of body 37 with interior finish surface 52. The exterior surface 54 of the widened finish 36 is also preferably cooled via application of a jetstream of air (or other cooling fluid) that forms a halo or ring in chamber 74 formed around the exterior of the widened finish 36 via collar 70 to assist in cooling of the expanded finish. As a further alternative, the upper mandrel body 37 can be heated (before being cooled) by fluid flow through one or more channels to facilitate the positioning of the expanded neck finish onto the body 37; this would be followed by cooling the mandrel body portion 35 (through the same or different fluid channels) in order to cool the expanded neck finish.

Figure 4:
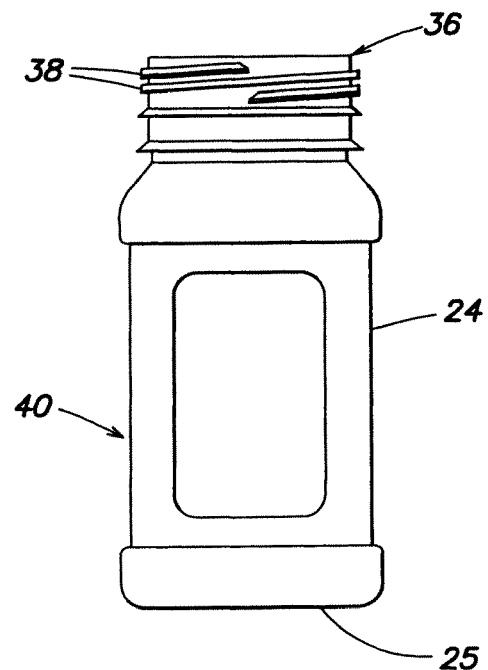
FIG. 4 is a schematic elevational view of a container formed by expanding and crystallizing the finish of the intermediate container product of FIG. 3.

The step of withdrawing 42 the mandrel 28, again preferably with rotation 31 (see FIG. 5), results in a container article 40 with an expanded finish 36 (see FIG. 4). This expanded neck container 40 has a body 24 and an integral expanded finish 36 with expanded threads 38 and an expanded aperture diameter relative to the diameter of the narrow-neck 14 of the initially blown article 22. Expanded finish 36 has external threads 38 with substantially the same relative geometry as the original injection molded preform threads 16, but which are radially and circumferentially expanded along with the finish. Thus, threads 38 are expanded or stretched as compared with preform threads 16, but otherwise have a geometry determined by the geometry of threads 16 as molded, which are more sharply defined and detailed than threads that can be obtained by blow molding.

More specific and alternative embodiments of various apparatus and methods for expanding and/or crystallizing a neck finish according to the invention are described below.

The intermediate blow molded articles 22 can be automatically deposited by any of the known deposit mechanisms 5 (FIG. 1) for placing articles 22, one each, onto platforms 60 as the platforms are moving on conveyor 67 along path 6. The articles 22 are preferably deposited in an orientation such that a bottom surface 25 of each article 22 is guided into engagement with a top support surface 200 (FIG. 5) of a platform 60. Once deposited on a platform, the article 22 is oriented in an upright disposition with its finish 14 disposed in a topmost location ready for operational engagement with a heating device in each of heat treatment stations 62, 63, the mandrel 28 at expansion station 26, and the sizing device 100 at crystallizing station 63.

The shape, size, construction and arrangement of the mechanisms used to support and align the articles on the conveyor 67 can assume a variety of suitable designs. In the embodiment shown in FIGS. 5-8, the bottles 22 are automatically deposited into a recess 202 (see FIG. 6) formed by and between retaining mechanisms 206 that extend from the top of each platform 60. In the embodiment shown, the retaining mechanisms are formed as posts or fingers that project upwardly from the top surface 200 of the platform 60. The recess 202 has a shape, size and configuration that is adjustable to be complementary in shape, geometry or configuration with the shape, size, geometry and configuration of the exterior side walls 22a of a container such that a container 22 can be readily deposited into and received within a recess 202.

Figure 6:
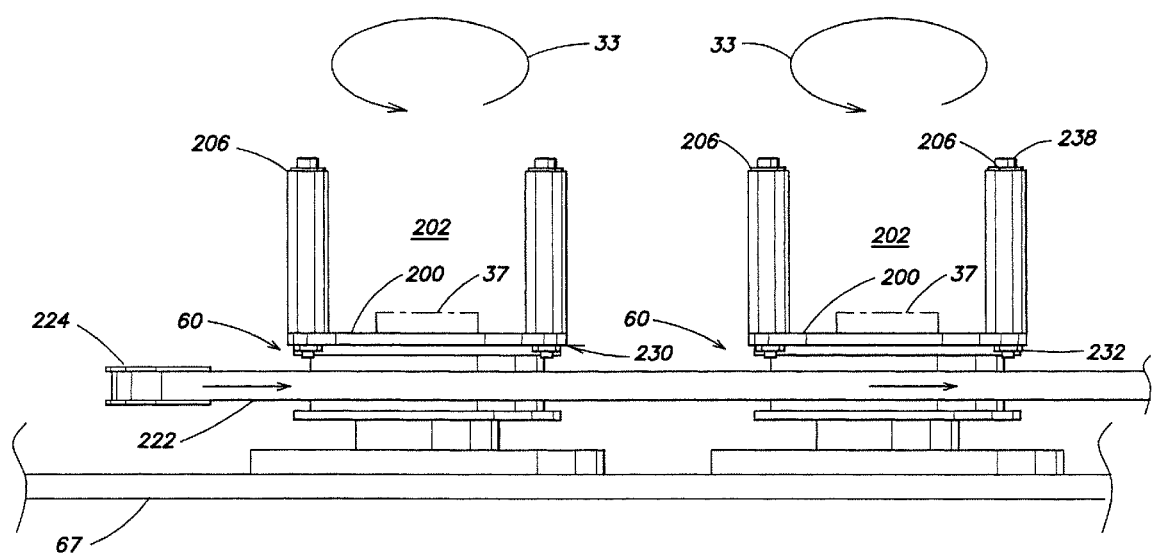
FIG. 6 is a side view of one embodiment for rotating a series of individual supporting structures (platforms) for carrying a series of intermediate container articles to be conveyed through the finish widening process.
Figure 7:
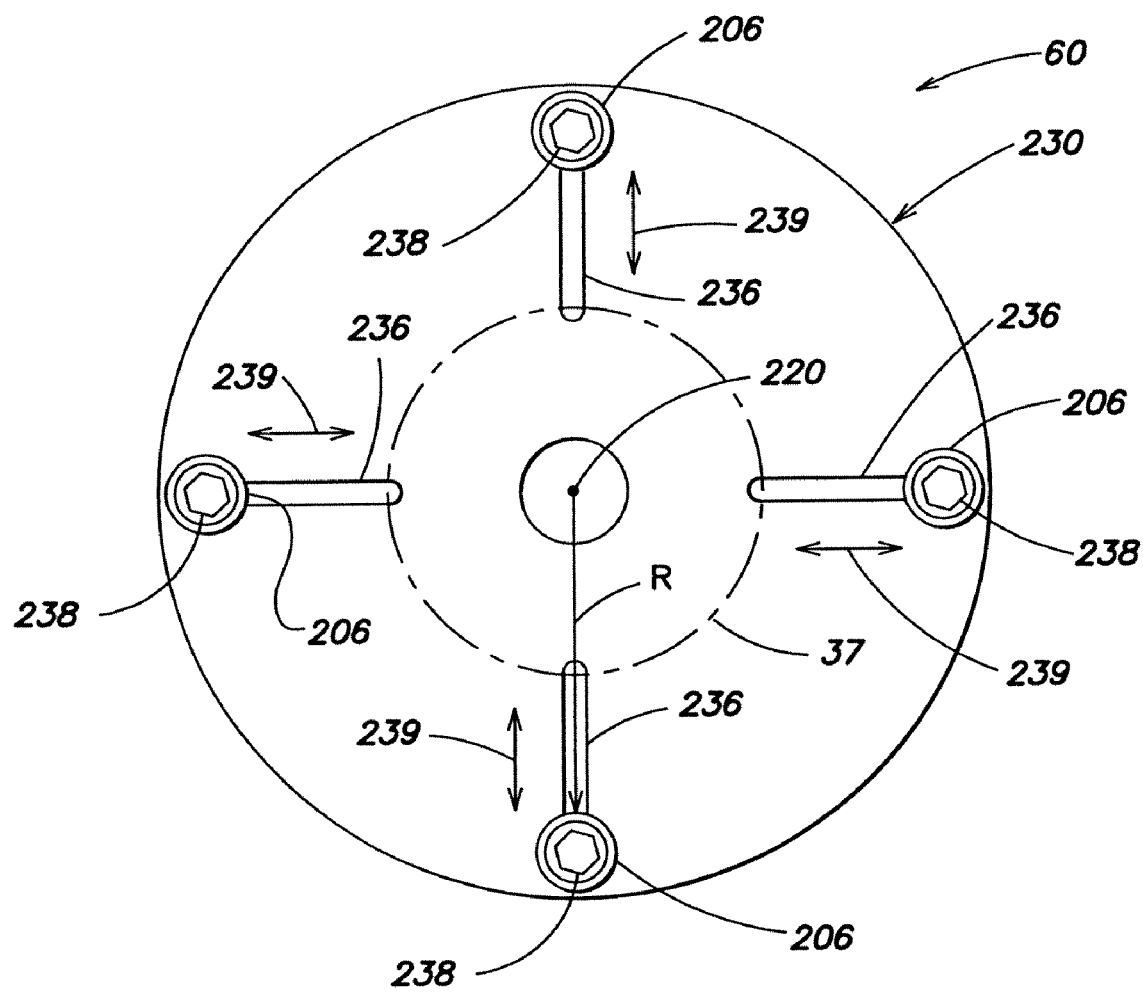
FIG. 7 is a top schematic view of a platform having movable support posts or fingers forming an adjustable recess for engaging the body of a container article.

In the embodiment shown in FIGS. 6-7, the support platform 60 has the form of a cylindrically shaped disc with a top support plate 230 having a top surface 200 on which the bottom surface 25 (see FIGS. 3 and 4) of the article/container 22/40 is positioned. The top plate or disc 230 has a radius R (see FIG. 7) from a central vertical axis 220 and the plate is provided with four radial slots 236 through which an axial mounting bolt 238 passes. The bolt 238 extends throughout the length of a hollow cylindrical bore in finger 206, enabling the four fingers 206 to be adjustably positioned or slid (see arrow 239) to any desired position along the length of the slot 236. When a finger has been slid to a desired position, the finger can be fixed at the desired position by the lower end of bolt 238 engaging with nut 232. Such adjustable positioning of the fingers enables the size/shape of a recess 202 to be selectively modified to accommodate the receipt of container bodies of different/varying sizes and shapes.

In the embodiment shown in FIGS. 6-7, a set-up fixture 37 shown in phantom can be used for setting the desired radial positioning of the four fingers 206 in slots 236. The diameter of fixture 37 matches the outer diameter of the container body to be held in recess 202, and thus the fingers are slid radially inwardly to engage fixture 37 and are then locked into position by tightening the bolt 238 into rectangular nut 232. The set-up fixture 37 is then removed and the support platform is ready to receive the container body.

FIG. 6 also shows a movable belt 222 mounted on a rotating pulley 224 which engages an upper portion of each platform 60 to provide relative rotation of the container finish with respect to the mandrel 28 (and sizing device 100). Thus, when platforms 60 enter the expansion station 26 (and crystallization station 63) the platforms are pushed transversely with respect to conveyer 67 on path 6 by, for example, a fixed rail (not shown) in order to engage the movable belt 222. The platforms (and the containers resting on the platforms) can be rotated during insertion/removal of the mandrel 28 and/or insertion/removal of the sizing device 100. It may also be desirable to rotate the platforms/containers for uniform heating at stations 62 and 63.

In the embodiment shown, the article 22 is generally cylindrical or circular in cross-section and the recess 202 is configured to accept such a shape. Apart from cylindrical shapes, recess 202 and platform 60 can be configured to receive and accommodate an article or container of any given shape, size, geometry or configuration including without limitation articles that are triangular, oval, square, rectangular, hexagonal or the like having rounded, curvilinear or sharply angled edges, indents, recesses, relief imprints and the like.

As previously discussed, the originally molded narrow-neck finish 14 is preferably heated at station 62 (see FIG. 1) in a radiant oven environment in which heat is directed at least at the material of the finish 14 itself in order to soften the polymer material of which the finish 14 is comprised. The finish temperature must be high enough so that the material can be readily expanded upon insertion 29 of the mandrel 28. For polyethylene terephthalate (PET) this means heating above the glass transition temperature. The $T_g$ of PET typically ranges from 172° F. (for a lower molecular weight PET) to 180° F. (for a higher molecular weight PET). It is desirable to heat the surface of the finish well above $T_g$, e.g., from 220-260° F. The mandrel itself is heated between about 160°-195° F. in order to maintain an elevated finish temperature (i.e., prevent an unacceptable drop in the finish temperature due to contact with a cold mandrel). Upon the insertion movement (see downward arrow 29 in FIG. 5), the outer surface of the lower mandrel body 50 makes contact with the inner diametric surface 52 of the neck 14 to cause the softened material of the narrow neck finish 14 to gradually expand to the diameter of the intermediate mandrel portion 34 as shown in FIG. 11B. The mandrel has a central bore 82 through which air may be directed into the article 22, 40 to support the relatively thin sidewall 24, e.g., during insertion of the mandrel and/or cooling of the expanded finish.

After expansion, the widened neck 36 is preferably cooled by continued insertion of the mandrel (see arrow 29a in FIG. 11C), thus positioning the widened neck 36 over portion 35 of the cooled upper body 37 of the mandrel 28. The cooled upper body portion 35 is cylindrical and has the same diameter as the intermediate portion 34 of heated lower body 51. Upper and lower bodies 37, 51 respectively are mounted such that they are thermally isolated from each other. In the embodiment shown in FIGS. 10-11, a thermal insulator 66 is sandwiched between bodies 37 and 51. The insulator 66 comprises a disc of a non-heat conducting material, such as a ceramic, the disc having the same diameter as portions 34 and 35. The disc 66 is mounted such that its top and bottom ends firmly engage portions 34 and 35 respectively, whereby a seamless continuous cylindrical surface of a single diameter is formed between the three portions 34, 66, 35 enabling the mandrel 28 to be fully inserted 29a to the position shown in FIG. 11C, in which position the undersurface 69 (see FIG. 5) of widened collar 68 (on body 37) engages the top surface of the widened neck 36. The upper mandrel body 37 is cooled for example by injection of cold water CW, and/or by other means. The cooled upper body portion 35 contacts the inner diametric surface 52 of the finish 36 and thus acts as a heat sink, drawing heat out of the finish 36 by conduction contact. In the case described above where PET is the primary neck material, the upper portion 37 is typically cooled to a temperature between about 85°-115° F., before removal of the mandrel.

In the embodiment shown, the cooling fluid (CW) is injected into channels 84 in the upper mandrel body 37. In contrast, a heating fluid (HW) is injected into and through insulated channels 86 in the upper body 37, in order to reach the uninsulated channels 87 in the lower mandrel body 51 (and heat the body 51).

As best shown in FIGS. 10-11, the upper mandrel body 37 preferably includes a circumferential cooling collar 70 having channels 72 for injection of a cooling fluid (such as cold air A) to cool the exterior surface 54 of the widened neck 36. The collar 70 is mounted to the mandrel body 37 such that a chamber or annular slot 74 is formed between a radially inwardly facing surface 76 of the collar 70, and a radially outwardly facing surface of the upper mandrel portion 35, forming a "halo" of cooling air in the chamber 74 around the expanded finish. As shown in FIG. 11C, the widened finish 36 is disposed within the chamber 74 upon full insertion 29a of the mandrel 28. The cooling air (A) is preferably of a temperature that is significantly lower than the temperature of the finish 36, e.g., cooling air (A) is less than about 150° F., preferably less than about 100° F. and most preferably less than about 75° F. Standard room temperature (about 72° F.) compressed air can be used. The mandrel 28 may be left in the position shown in FIG. 11C for a time that is sufficient to cause the material of the finish 36 to cool to a predetermined temperature and/or to allow the polymer material of the finish to crystallize or partially crystallize to a predetermined extent. Next, the mandrel 28 is removed 42 from the finish 36 as shown in FIGS. 5 and 11D, typically via simultaneously rotating 31 the mandrel 28 together with the vertical removal movement (see arrow 42).

As shown in FIG. 10, the outer surfaces of the upper and lower bodies 37, 51 that come into contact with the inner diametric surface 52 of the finish are preferably coated with a layer 80 of low friction, non-stick material to enable the mandrel 28 to be more readily inserted and removed during the insertion and removal operations 29, 29a and 42. Suitable examples of such low friction materials are polyfluorocarbon polymer materials, e.g. a Teflon or Teflon-like material such as poly(tetrafluoroethylene) (PTFE) or poly(tetrafluoroethylene-co-hexafluoropropylene) (FEP).

Expansion of the container finish can be carried out in a single step as described. Alternatively, the finish expansion can be carried out in sequential stages before and after blow molding. For example, an initial 28 mm finish may be expanded to 43 mm prior to blow molding the container body, where the blow mold accepts a 43 mm neck diameter preform. After blow molding, the finish could then be further expanded to 63 mm. As another modification, the finish could be slightly over-expanded, and then allowed to shrink and relax. For example, the finish could be expanded from 43 mm to 63.5 mm, and then allowed to shrink, perhaps onto a plug, to 63 mm. This would have the advantage of allowing stress relief after expansion. Shrinkage could be induced by exposure to heat, such as during a crystallization operation.

By way of example, a finish 14 having an initial diameter of 28 mm can be expanded in a first oven treatment 62 and mandrel insertion 29 sequence to a finish 36 having a 43 mm diameter, or a diametric expansion of about 53.6%. In another example, a 43 mm diameter finish 14 can be expanded to a finish 36 having a 63 mm diameter, or an expansion of about 46.5%. In another example, a 28 mm diameter finish can be expanded to a 63 mm finish diameter, with an expansion of about 125%. In yet another example, a 63 mm finish diameter can be expanded to 83 mm, or an expansion of about 32%. The preform threads 16 and finish 14 will be larger and thicker than those of the final finish 36 and are sized to arrive at the proper dimensions after stretching.

Figure 8:
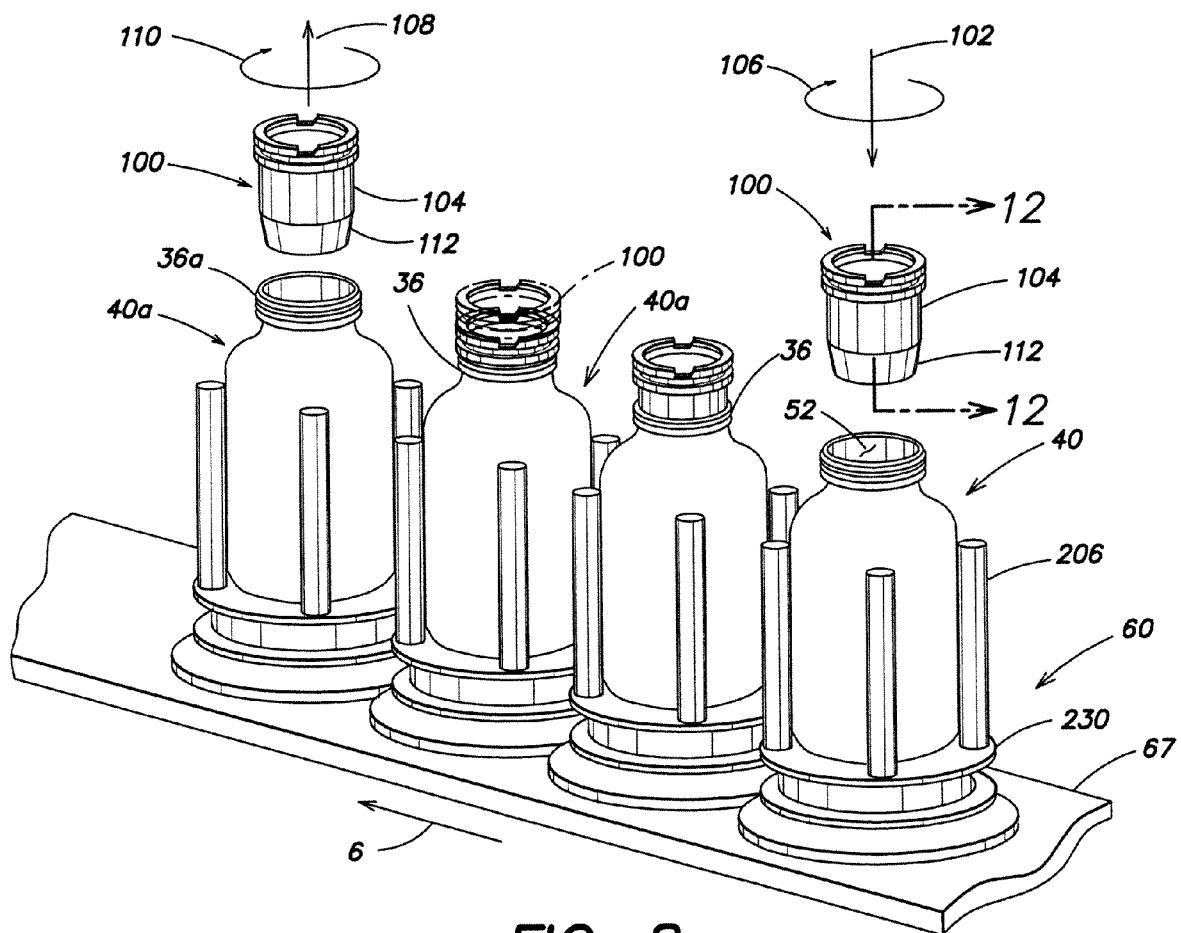
FIG. 8 is a schematic diagram of one embodiment of a method and apparatus for sequential insertion and removal of a sizing device into and from an expanded finish at a finish crystallizing station.
Figure 9:
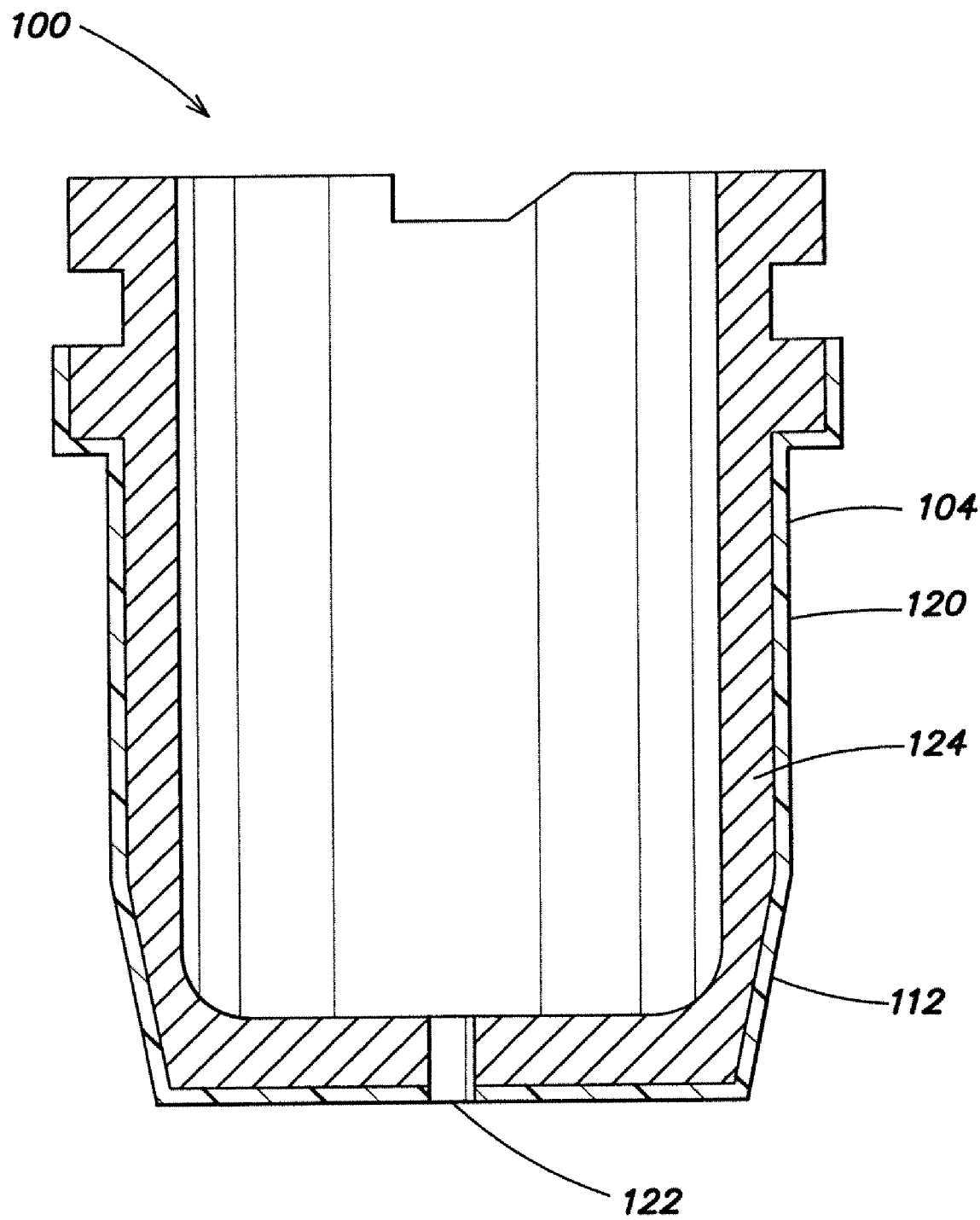
FIG. 9 is a side cross-sectional view of the sizing device of FIG. 8.

As shown in FIGS. 8-9, the sizing device 100 may comprise a hollow cup or cup-like body 124 of a highly thermally conductive material such as a metal, e.g., aluminum, iron, steel, copper and like metal materials and/or alloys of one or more of such metals. The cup 100 has a circumferential outside surface 104 that is complementary to the size, shape and geometry of the inside surface 52 of the enlarged finish 36 such that when the finish 36 is subjected to the second heat treatment 63, the outside surface 104 of the cup 100 prevents the enlarged finish 36 from shrinking in size to any size less than the size, circumference, diameter or the like of the surface 104 of the cup 100. By complementary it is meant that the surface 104 is substantially the same size as the size of the inside surface 52, such that the surface 104 preferably comes into intimate engagement contact with surface 52 immediately upon insertion 102 and/or upon shrinkage of the finish 36a during the course of the heat treatment process 63.

As shown in FIGS. 8-9, the cup 100 also has a beveled or conically shaped leading/bottom portion 112 having an outer circumferential size/diameter that is less than the inner circumferential size/diameter of the inside surface 52 of the expanded finish 36, such that the bottom cup portion 112 acts as a guide for insertion of the larger diameter upper surface portion 104 of the cup 100. The metal or other material of the cup body 124 is selected to function as a heat conductive sink, i.e. a body of material that is capable of acting as a repository of heat transmitted by conduction from the heated finish 36 to the cup body 124 before, during and/or after the heat treatment step 63. Thus the cup body 124 comprises a mechanism for cooling the heated finish 36. In a preferred embodiment, where the finish is PET, the finish exits the crystallizing station 63 at a temperature of about 350° F. It should be cooled to around 200° F.±20°, before removing the cup. This may be accomplished by directing a stream of cold air into the top of the cup to cool the cup directly, and the finish indirectly (by contact with the cup). The cold air stream may also be directed onto the finish itself, to cool the finish directly. The cup 100 is preferably provided with an outermost coating 120 of low friction, highly non-stick material (such as previously described) to enable the cup 100 to be more readily inserted and removed during the insertion and removal operations 102, 108. Most preferably the bottle 40 is rotated (see arrow 106) around its axis during the insertion step 102 (by rotating platform 230) and the bottle is similarly rotated (see arrow 110) during the removal step 108. The bottom of the cup may have a central vent bore 122 to allow escape of the volume of air displaced during insertion of the cup into the bottle, and thus prevent the cup from popping out of the bottle.

As shown on the left hand side of FIG. 8, the cup 100 is removed 108 from the neck 36 after the oven treatment step 63 is complete. The timing of the removal step 108 (subsequent to completion of the heat treatment step 63) is selected to allow the heated neck 36 to cool to a temperature at which the neck will no longer shrink or otherwise deform or deviate in size to any significant degree, i.e. less than about 2% subsequent to completion of the crystallization step 63.

The stretching of the finish 14 and threads 16 may achieve an advantageous molecular orienting in the expanded finish 36 and threads. The initial stretching may also strengthen the neck area of the final container 40. The second heat treatment step 63 may wholly or partially crystallize the material of the finish 36. Crystallization serves to change the orientation of the polymer material from an amorphous state to an ordered state that resists and/or prevents relaxation and shrinkage, particularly when the container is to be employed in hot-fill, refill, pasteurization or other high temperature applications. Such crystallization of the finish 36 can be partial, i.e. limited to the exterior surface or to a relatively small depth from the surface of the finish including the threads, or may extend more deeply through a portion of the thickness of the finish or may extend entirely through the entire thickness of the container finish 36.

In an alternative embodiment, a crystallization step can be carried out simultaneously with insertion of the mandrel 28 to stretch/widen the finish 14. For example, the mandrel 28 can be inserted 29 during the course of a first heat treatment step (such as 62 as described above), and a time and temperature employed (when the mandrel is in the FIG. 11B or C position), along with timing of the removal of the cooled upper mandrel portion 35 to allow the finish 36 to both stretch upon insertion 29 of the mandrel 28 and to allow the stretched finish 36 to crystallize or partially crystallize to a selected degree prior to removal 42 of the mandrel 28. As described in the preferred embodiment regarding insertion of the cup 100, insertion of the mandrel 28 during step 62 may prevent the widened neck 36 from shrinking in size as well as to cool the material of the neck 36. The subsequent crystallization or partial crystallization in the neck material 36 then stabilizes the widened neck 36 against shrinkage such that the mandrel 28 can be removed 42 without risk of significant further shrinkage (thus mitigating the need for the separate steps of insertion and removal of the sizing cup).

These and other modifications would be readily apparent to the skilled person as included within the scope of the described invention.

The invention claimed is:

1. Method for treating a series of molded plastic articles through one or more treatment stations having an operational mechanism for treating the article, each article having a relatively wide and thin-walled blow-molded body portion and a relatively narrow and thick-walled unexpanded neck finish portion, the method comprising:
    providing a series of platforms that are transported by a conveying apparatus through the one or more treatment stations;
    providing each platform with a mating mechanism having a recess that adjustably receives and engages a sidewall portion of the body portion of one article;
    depositing one article on each platform and within the recess of the mating mechanism in an orientation wherein the recess engages the article sidewall portion and a top surface of the platform engages a bottom surface of the article and aligns the finish portion in a position that enables operational engagement with the operational mechanism of the one or more treatment stations;
    conveying the articles on the platforms through the one or more treatment stations; and
    treating the articles with the operational mechanism as the articles are conveyed through the one or more treatment stations.

2. The method of claim 1, wherein the step of treating comprises widening the finish portion.

3. The method of claim 2, wherein the step of treating comprises inserting an expansion mandrel within an open top aperture of the finish portion to widen the finish portion.

4. The method of claim 3, wherein the inserting step includes rotating one or both of the finish portion and the mandrel.

5. The method of claim 2, wherein the step of treating includes cooling the widened finish portion.

6. The method of claim 5, wherein the cooling step includes interior conductive cooling and exterior convective cooling of the widened finish portion.

7. The method of claim 2, wherein the widening step includes heating the finish portion to enable insertion of the mandrel to widen the finish portion.

8. The method of claim 1, wherein the step of treating comprises heating the widened finish portion to crystallize at least a portion of the widened finish portion.

9. The method of claim 7, wherein the crystallizing step includes providing a sizing device in the expanded finish portion as the expanded finish portion is being heated and crystallized.

10. The method of claim 1, wherein the step of treating comprises:
    heating and widening the finish portion by inserting an expansion mandrel within an open top aperture of the finish portion;
    cooling the widened finish portion by interior conductive cooling and exterior convective cooling; and
    heating and crystallizing at least a portion of the widened finish portion while a sizing device is positioned in the widened finish portion.

11. The method of claim 10, including at least one of:
    rotating the finish portion with respect to the mandrel during insertion and/or removal of the mandrel; and
    rotating the finish portion with respect to the sizing device during insertion and/or removal of the sizing device.

12. Method for treating a series of molded plastic articles, each article having a relatively wide and thin-walled blow-molded body portion and a relatively narrow and thick-walled unexpanded neck finish portion, the method comprising:
    transporting a series of platforms carried by a conveying apparatus along a predetermined path of travel through one or more treatment stations;
    each platform having a top surface and a mating mechanism for engaging the body portion of one article, the top surface engaging a bottom surface and the mating mechanism engaging a sidewall surface of the body portion of the one article;
    wherein at the one or more treatment stations, at least one operational mechanism engages or contacts the finish portion;
    depositing one article on each platform in an orientation that directs the bottom surface of the body portion into engagement with the top surface of the platform and arranges the finish portion in an orientation that enables the operational mechanism of a treatment station to engage the finish portion; and
    the mating mechanism adjustably receiving and engaging against the sidewall portion to hold the one article in a steady position on the platform during transport of the article through the one or more treatment stations.

13. The method of claim 12, wherein the operational mechanism of one treatment station comprises a mandrel that is forcibly inserted within and removable from an open top aperture of the finish portion, to widen the finish portion.

14. The method of claim 13, wherein the operational mechanism of the one or another treatment station includes a heating device that conductively heats the finish portion prior to insertion of the mandrel.

15. The method of claim 14, wherein the operational mechanism of the one or another treatment station includes a cooling device that applies interior conductive cooling and exterior convective cooling to the widened finish portion.

16. The method of claim 15, wherein the operational mechanism of the one or another treatment station comprises a heating device that heats the finish portion for a time and to a temperature selected to crystallize at least a portion of the widened finish portion.

17. The method of claim 16, wherein the crystallizing station includes a sizing cup insertable within and removable from the widened finish portion.

* * * * *